United States Patent [19]
Dumont

[11] Patent Number: 5,587,703
[45] Date of Patent: Dec. 24, 1996

[54] UNIVERSAL MERCHANDISE TAG

[76] Inventor: Charles Dumont, 8925 Collins Ave., Surfside, Fla. 33154

[21] Appl. No.: 419,434

[22] Filed: Apr. 10, 1995

Related U.S. Application Data

[63] Continuation-in-part of Ser. No. 328,683, Oct. 25, 1994.

[51] Int. Cl.⁶ .................................................. G08B 13/14
[52] U.S. Cl. ........................ 340/572; 340/571; 340/568; 340/693; 72/57.1; 116/211
[58] Field of Search ...................................... 340/572, 571, 340/551, 568, 693; 24/704.1, 703.1; 70/57.1; 116/211

[56] References Cited

U.S. PATENT DOCUMENTS

| | | | |
|---|---|---|---|
| 4,134,538 | 1/1979 | Lagarde et al. | 340/572 |
| 4,575,624 | 3/1986 | Klinkhardt | 340/572 |
| 4,649,397 | 3/1987 | Heaton et al. | 340/572 |
| 4,692,747 | 9/1987 | Wolf | 340/572 |
| 4,698,620 | 10/1987 | Marshall | 340/572 |
| 4,909,356 | 3/1990 | Rimondi et al. | 186/61 |
| 4,912,906 | 4/1990 | Toner | 53/463 |
| 4,929,928 | 5/1990 | Hultiker | 340/572 |
| 4,964,053 | 10/1990 | Humble | 364/466 |
| 4,998,094 | 3/1991 | Englmeier et al. | 340/572 |
| 5,031,287 | 7/1991 | Charlot, Jr. et al. | 24/704.1 |
| 5,054,172 | 10/1991 | Hogan et al. | 24/704.1 |
| 5,059,951 | 10/1991 | Kaltner | 340/572 |
| 5,068,643 | 11/1991 | Yashina | 340/571 |
| 5,151,684 | 9/1992 | Johnson | 340/572 |
| 5,170,045 | 12/1992 | Bengtsson | 235/462 |
| 5,304,786 | 4/1994 | Pavlidis et al. | 235/462 |
| 5,316,107 | 5/1994 | Wieschemann et al. | 186/61 |
| 5,340,970 | 8/1994 | Wolfe, Jr. et al. | 235/383 |
| 5,438,738 | 8/1995 | Stolz et al. | 70/57.1 |

Primary Examiner—John K. Peng
Assistant Examiner—Benjamin C. Lee
Attorney, Agent, or Firm—Oltman Flynn & Kubler

[57] ABSTRACT

A purchase item security and information tag apparatus for attachment to a purchase item in a store includes a tag body, a purchase item information display mechanism for retaining item data in machine readable form, and a tag engagement security mechanism including an elongate item engaging member which spoils the item with dye if cut away from the item by a customer. The tag engagement security mechanism preferably includes a tubular item engaging member containing a dye, so that the dye escapes and spoils the purchase item if cut by a customer without prior deactivation of the tag engagement security mechanism. The dye is preferably contained at a pressure greater than atmospheric to cause the dye to spatter and spray onto the purchase item. An alternative purchase item security and information tag apparatus for attachment to a purchase item in a store includes a tag body, a purchase item information display mechanism for retaining item data in machine readable form, a tag engagement security mechanism including an elongate item engaging member which sounds an alarm if cut away from the item by a customer, where the tag engagement security mechanism includes an electrically conductive item engaging member configured as a loop for extending through part of a purchase item forming part of an electric circuit including an alarm mechanism and a power source, so that opening the circuit prior to deactivation sounds the alarm mechanism.

10 Claims, 5 Drawing Sheets

UNIVERSAL MERCHANDISE TAG

FILING HISTORY

This application is a continuation-in-part of application Ser. No. 08/328,683 filed on Oct. 25, 1994 now allowed.

BACKGROUND OF THE INVENTION

1. Field of the Invention

The present invention relates generally to the field of purchase item security devices and price display tags. More specifically, the present invention relates to a purchase item security and information tag apparatus for secure attachment to a purchase item in a store.

The apparatus preferably includes a tag body in the form of a flat, rectangular shell containing purchase item information display means for retaining item data in machine readable form. The data stored in the information display means includes the item price as well as optional item weight, volume and merchandise category data. The information display means may include a bar code, a magnetic strip, or a computer RAM chip. One or more digital display panels are preferably provided to display the purchase item price, size and other individual item characteristics in a form discernable by the human eye. The apparatus also preferably includes a tag security mechanism including an elongate item engaging member which either sounds an alarm powered by a battery or spoils the item with dye if cut away from the item by a customer prior to check-out. The item engaging member may take either a loop configuration or the common "T" configuration.

2. Description of the Prior Art

There have recently been several check-out purchase item marking and processing devices which are intended to provide item data and security during item check-out. These devices have generally not been equipped to reliably and conveniently secure the purchase items against theft or price tag switching.

Such prior devices include Humble, U.S. Pat. No. 4,964,053, issued on Oct. 16, 1990, which teaches an apparatus for self-checkout of produce items. Humble processes both UPC identified articles and non-coded articles such as produce. The customer enters an icon at a monitor identifying a purchase item and the weight of the item is checked against data stored for the given icon. A problem with Humble is that the variety of purchase items which can be checked in this way is limited to the number of available icons. Another problem is that the customer might cause the correct item to be weighed and then switch the item for another more expensive one before paying. Another problem is that the icon does not sound a store exit alarm if removed without being checked-out.

Wolf, U.S. Pat. No. 4,692,747, issued on Sep. 8, 1987, discloses an article security system. A customer selects purchase items and places them at one end of a check-out aisle. The customer proceeds along a path separated from the item path to prevent customer contact with the items during check-out. The customer path is equipped with an electronic surveillance system which sounds an alarm if the customer passes through it with a tagged item. A problem with Wolf is that the customer might remove a tag and walk out with the items or switch item tags with less expensive items.

Rimondi, et al., U.S. Pat. No. 4,909,356, issued on Mar. 20, 1990, reveals a self-service check-out counter. The Rimondi, et al. counter incorporates an integral apparatus for on-demand manufacturing of custom-sized bags conforming to the volume of articles received in the bags. A counter having a data entry keyboard is provided at which the customer individually scans purchase items, and then the customer places the items into the bag-forming apparatus. A bag is formed corresponding to the size and weight parameters of the various purchase items, this data being entered by the customer on the keyboard. Devices are also provided for preventing pilferage, fraud and inadvertent errors. Another problem is that the customer must perform the time-consuming and tedious task of manually entering item data for each purchase, making for customer inconvenience and slow check-out lines. Another problem is that the customer might falsify data.

Toner, U.S. Pat. No. 4,912,906, issued on Apr. 3, 1990, teaches an automatic bag system for a supermarket check-out counter. Sheet plastic is fed into an open top of a purchase item loading compartment located next to a conventional item scanner in a check-out counter. Purchase items are loaded into the compartment above the plastic sheeting and the sheeting is urged inwardly within the loading compartment to assume the shape of the contained items. Then edges of the sheeting are heated to bond together into a sealed purchase item bag. Problems with Toner are that the bagging system does nothing to prevent customer tampering of items and their price tags during checking.

Hultaker, U.S. Pat. No. 4,929,928, issued on May 29, 1990, discloses a magnetized ink, paint or dye used on purchase items to prevent theft. The ink to be applied on the purchase items is mixed with magnetized particles which sound an alarm if carried through a store exit sensor. The particles are demagnetized upon item checking and customer payment. A problem with Hultaker is that the magnetic ink does not prevent the customer from switching item price tags during or prior to checkout. Another problem with Hultaker is that customer self-checkout is apparently not an option, since an employee must verify that payment is made before demagnetizing the ink.

Johnsen, U.S. Pat. No. 5,151,684, issued on Sep. 29, 1992, reveals an electronic inventory label and security apparatus. Johnsen is provides item data storage tags which are secured to purchase items with connecting members. The tags have item data including price, accounting and inventory control data stored on them in machine readable form, and include item security means. Cutting the connecting member prior to checkout breaks an electric circuit and sounds an alarm in the tag. A problem with Johnsen is that tag re-use may not be practical because of no clear means being provided for attaching a new connecting member.

Bengtsson, U.S. Pat. No. 5,170,045, issued on Dec. 8, 1992, teaches a price tag deactivator, where the tags include bar codes and alarm activating magnetic strips. Bengtsson includes several rows of permanent magnets disposed in a plane substantially parallel with the plane in which the tag bar code on a purchase item is located. The magnetic poles bring about tag deactivation. A problem with Bengtsson is that no workable provision is made to prevent purchase item switching or tag tampering before or during check-out.

Pavlidis, et al., U.S. Pat. No. 5,304,786, issued on Apr. 19, 1994, reveals a high density two-dimensional bar code symbol. A nonvolatile electro-optical read-only memory includes a substrate on which is printed a complex symbol with a high density two-dimensional configuration. Component symbols or codewords are provided in alternating rows. A problem with Pavlidis, et al., is that, while it provides a data storage function, it lacks any significant purchase item security function.

Wieschemann, et al., U.S. Pat. No. 5,316,107, issued on May 31, 1994, discloses a device for checking out purchase items. Wieschemann, et al., includes a check-out apparatus which checks items automatically or manually as the items are presented to the apparatus. A problem with Wieschemann, et al., is that item security against price tag tampering and switching is minimal.

Wolfe, Jr., et al., U.S. Pat. No. 5,340,970, issued on Aug. 23, 1994 teaches a purchase item check-out system with security parameter override capacity. The Wolfe, Jr., et al. apparatus is intended to automatically check out purchase items bearing an identification code. The apparatus includes a code reader generating output signals indicative of the article identification codes, a sensor generating output signal indicative of measurable item characteristics, a memory for storage for each of the articles, an article rejector and various other item processing elements. A problem with Wolfe, Jr., et al., is that a customer might circumvent the system by removing a price tag.

It is thus an object of the present invention to provide a security and information tag apparatus which retains data about the item to which it is attached in machine readable form for rapid and accurate check-out.

It is another object of the present invention to provide such an apparatus which alerts store employees to unauthorized apparatus removal with a re-usable electric and/or magnetic alarm or a dye-loaded item tag anchoring members.

It is still another object of the present invention to provide such an apparatus which is suitable for both store employee operated check-out and for customer self-checkout and which is easy for an average customer to understand and use.

It is finally an object of the present invention to provide such an apparatus which is relatively simple in design and inexpensive to manufacture.

SUMMARY OF THE INVENTION

The present invention accomplishes the above-stated objectives, as well as others, as may be determined by a fair reading and interpretation of the entire specification.

A purchase item security and information tag apparatus is provided for attachment to a purchase item in a store, including a tag body, a purchase item information display mechanism for retaining item data in machine readable form, and a tag engagement security mechanism including an elongate item engaging member which spoils the item with dye if cut away from the item by a customer.

A more elaborate version of the apparatus for more expensive purchase items preferably includes a tag body in the form of a hollow shell containing the purchase item information display mechanism. For less expensive items, simpler versions of the apparatus include a tag body in the form of a substantially solid panel, similar to a credit card. The panel tag body is flat, and has either a bar code only and/or a magnetic strip only and/or a microprocessor RAM chip only and/or a magnetic resonant alarm without a battery, and operates with a magnetic field. In the event a purchase item is illegally taken out of a store with the tag apparatus attached, the store exit alarm will be activated due to the passing of the apparatus magnetic field near an exit sensor. Should an item be forcibly removed from a checkout vessel during checkout, without the tag apparatus having been placed into the tag checking slot or across the check-out scanner, an alarm is activated once again through the presence of the apparatus magnetic field. The only way to remove a tagged item from the store is to separate the tag apparatus from the item and to carry the item out of the store. The item would have to be hidden somewhere other than in a store shopping bag, since these bags are sealed at the check-out station. To prevent this type of theft, the tag engaging member for the simpler versions of the apparatus is preferably formed of a strong wire which only the checking apparatus can cut.

The information display mechanism preferably includes a bar code, a magnetic strip, or a computer chip. The apparatus may additionally include a digital display panel for displaying at least part of the purchase item data in a form discernable to the human eye. The tag engagement security mechanism preferably includes a tubular item engaging member containing a dye, so that the dye escapes and spoils the purchase item if cut by a customer without prior deactivation of the tag engagement security mechanism. The dye is preferably contained at a pressure greater than atmospheric to cause the dye to spatter and spray onto the purchase item.

The tag engagement security mechanism preferably includes a substantially evacuated dye receiving chamber, a valve between the engaging member and the dye receiving chamber, and a deactivation mechanism including a control wire provided within a wire guide mechanism in the tag body, the wire guide mechanism opening as a port in an outer surface of the tag body, the wire operating the valve when the wire is driven along the wire guide mechanism away from the port to open fluid communication between the engaging member and the chamber so that the dye exits the engaging member to fill the substantially evacuated chamber, so that the engaging member may be cut without releasing dye. The valve is preferably a check valve to prevent dye from exiting the chamber after tag engagement security mechanism deactivation. The apparatus preferably additionally includes an exit alarm triggering mechanism for triggering a store exit alarm having an exit alarm sensor when passed near the exit alarm sensor.

A purchase item security and information tag apparatus is also provided for attachment to a purchase item in a store, including a tag body, a purchase item information display mechanism for retaining item data in machine readable form, a tag engagement security mechanism including an elongate item engaging member which sounds an alarm if cut away from the item by a customer, where the tag engagement security mechanism includes an electrically conductive item engaging member configured as a loop for extending through part of a purchase item forming part of an electric circuit including an alarm mechanism and a power source, so that opening the circuit prior to deactivation sounds the alarm mechanism. The tag body preferably includes a hollow shell containing the purchase item information display mechanism.

A purchase item security and information tag apparatus if further provided for attachment to a purchase item in a store, including a tag body, a purchase item information display mechanism for retaining item data in machine readable form, a tag engagement security mechanism including an elongate item engaging member which sounds an alarm if cut away from the item by a customer, where the tag engagement security mechanism includes an electrically conductive item engaging member configured as a loop for extending through part of a purchase item forming part of an electric circuit including an alarm mechanism and a power source, so that opening the circuit prior to deactivation sounds the alarm mechanism, and where the tag engagement security mechanism includes a deactivation mechanism including a control wire provided within a wire guide mechanism in the tag body, the guide mechanism opening as a port in the tag body, the control wire making contact with the circuit when slid along the wire guide mechanism and away from the port, so that the wire forms a short in the circuit diverting current away from the engaging member, so that the engaging member can be cut without opening the circuit.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
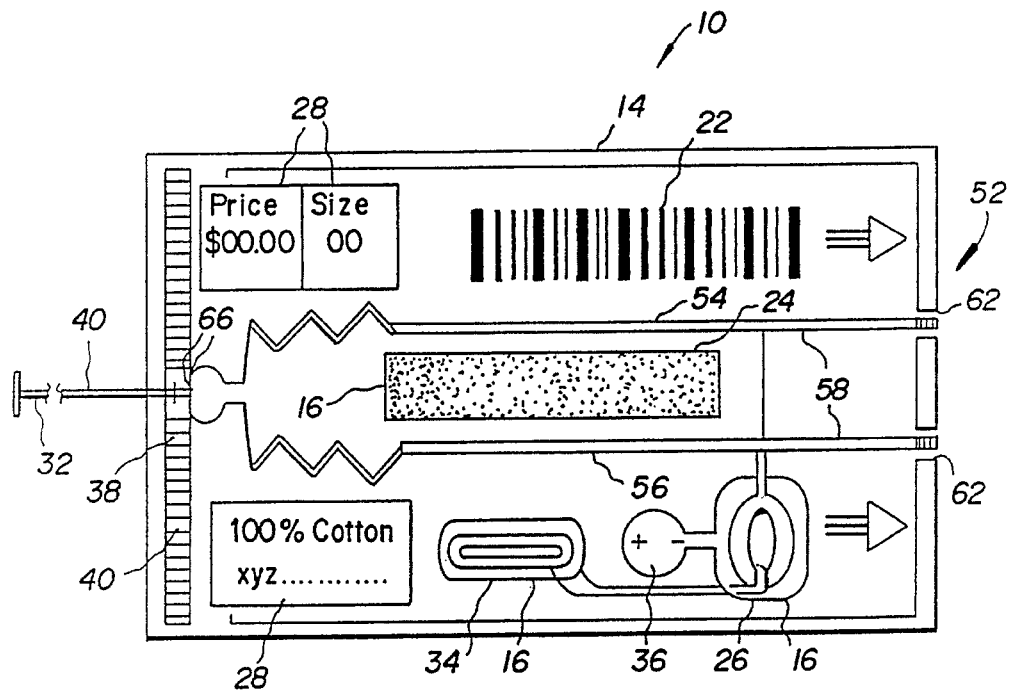
FIG. 1 is a cross-sectional, partly schematic view of one embodiment of the inventive item tag, revealing the T-shaped elongate item engaging member, formed of two closely spaced parallel conductive wires connected at their free ends by the T-cross-member. This embodiment is also shown to include three preferred alternative information display means in the form of a bar code, a magnetic strip and a computer RAM chip. Also shown are the control wires for deactivating the item tag engagement security mechanism, which in this instance is an alarm.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Figure 2:
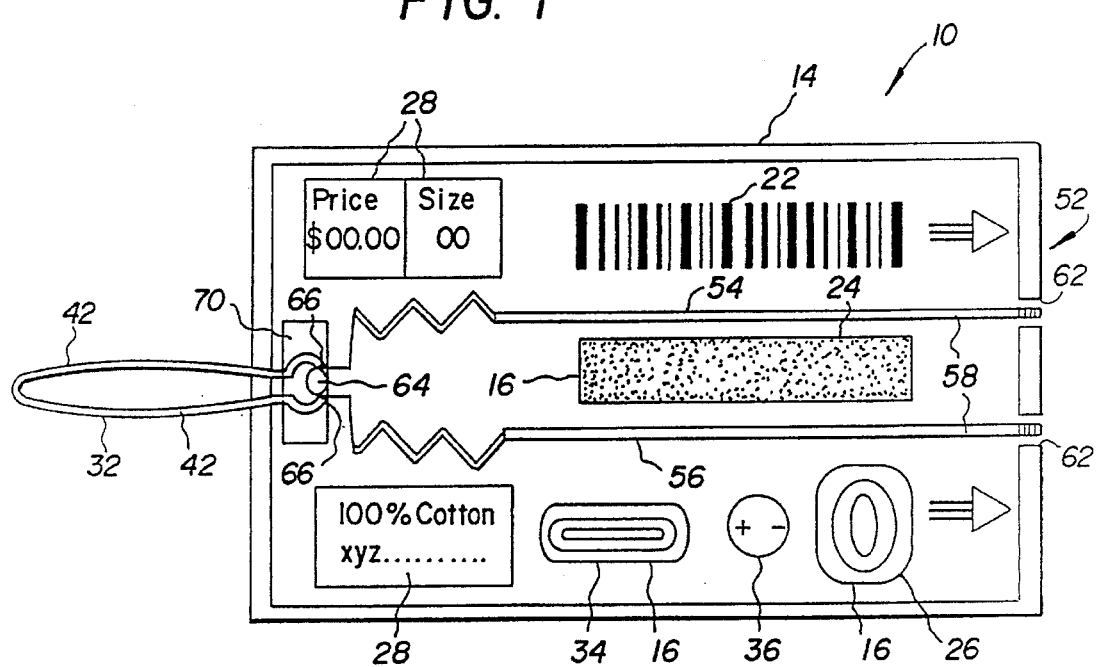
FIG. 2 is a cross-sectional, partly schematic view of another embodiment of the inventive item tag, revealing the tubular loop-shaped elongate item engaging member which contains a dye, and three preferred alternative information display means in the form of a bar code, a magnetic strip and a computer RAM chip. Also shown are the control wires for deactivating the item tag engagement security mechanism, which in this instance is a pressurized dye.
Figure 3:
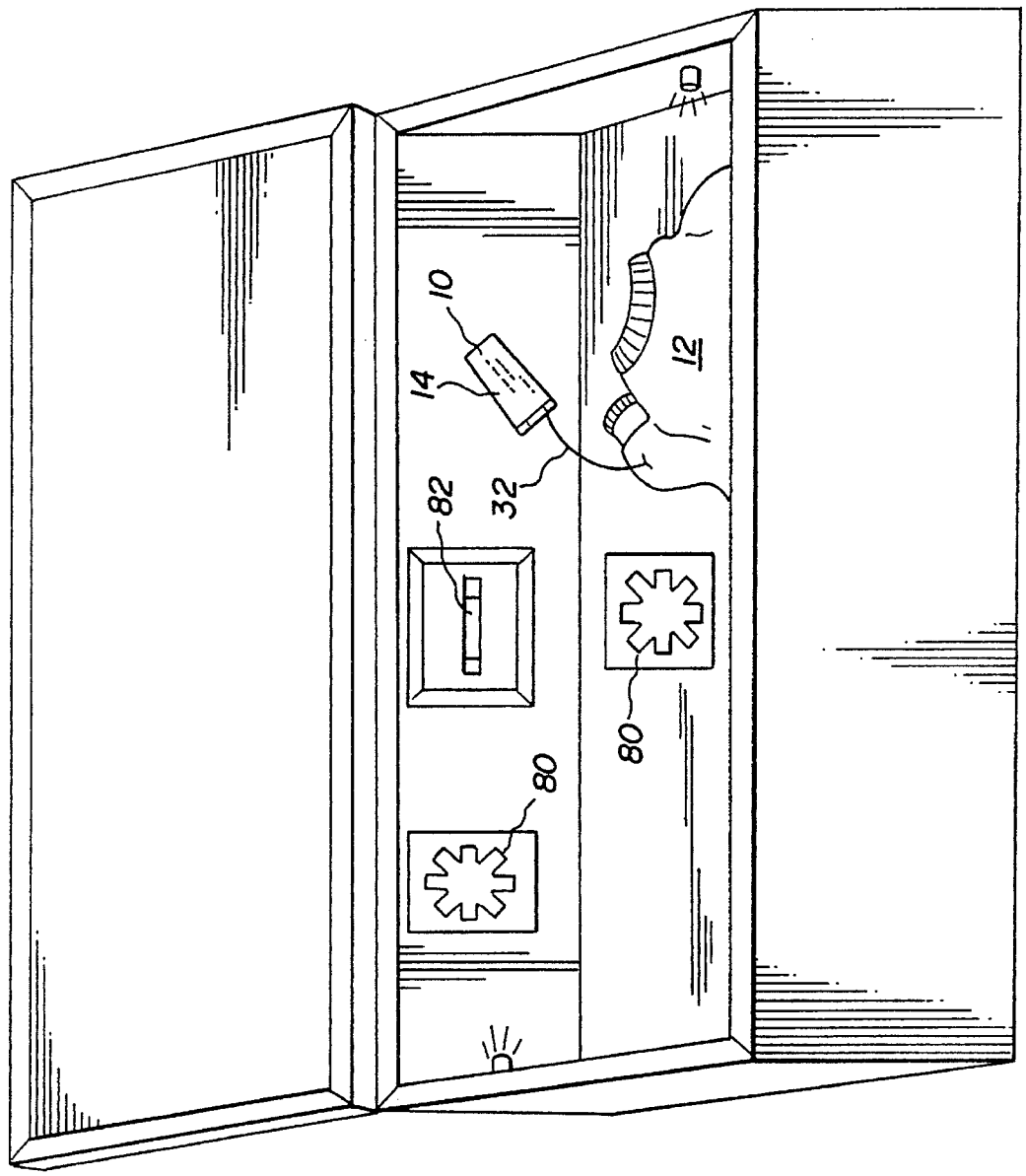
FIG. 3 is a perspective view of a check-out vessel capable of checking the inventive item tags, revealing an item tag receiving slot and vessel sensing and alarm means.

Referring to FIGS. 1–2, a purchase item security and information tag apparatus 10 for secure attachment to a purchase item 12 in a store is disclosed. Apparatus 10 preferably includes a tag body 14 in the form of a flat, rectangular shell containing purchase item information display means 16 for retaining item 12 data in machine readable form. The data stored in information display means 16 includes the item price as well as optional item weight, volume and merchandise category data. Information display means 16 may include a bar code 22, a magnetic strip 24, or a computer RAM chip 26. One or more digital display panels 28 are preferably provided to display the purchase item 12 price, size and other individual item characteristics in a form discernable to the human eye. Apparatus 10 also preferably includes a tag engagement security mechanism 30 including an elongate item engaging member 32 which either sounds an alarm mechanism 34 powered by a battery 36 or spoils the item 12 with dye 42 if cut away from the item 12 by a customer. Item engaging member 32 may take either the common "T" configuration or a loop configuration, as shown in FIGS. 1 and 2, respectively.

The alarm version of the tag engagement security mechanism 30 includes an electrically conductive item engaging member 32 configured as a "T" extending through part of a purchase item 12. Engaging member 32 is preferably formed of two closely spaced parallel wires which are connected by the "T" top cross-wire. Engaging member 32 in this instance forms part of an electric circuit 40 which also includes alarm mechanism 34 and battery 36. Opening circuit 40 such as by the customer cutting engaging member 32 to free the purchase item 12 sounds alarm mechanism 34, unless tag engagement security mechanism 30 is first deactivated at a check-out station 50. This version of apparatus 10 may be re-used after engaging member 32 is cut away, by stapling on a new engaging member 32 to the terminal or matrix 38.

The dye version of the tag engagement security mechanism 30 includes a hollow, tubular item engaging member 32 containing a dye 42, such as a permanent ink. Dye 42 is preferably contained at a pressure greater than atmospheric to cause dye 42 to spatter and spray onto and spoil the purchase item 12 if cut by a customer without prior deactivation at a check-out station 50.

Each version of the tag engagement security mechanism 30 preferably includes deactivation means 52 including control wires 54 and 56 provided within narrow, longitudinal passageways 58 in tag body 14. Passageways 58 open as inconspicuous small ports 62 in the end of tag body 14 opposite the elongate item engaging member 32. For the alarm version, wires 54 and 56 preferably make contact with circuit 40 when slid along passageways 58 and away from ports 62, such as with the insertion of push rods (not shown) into passageways 58 at the check-out station 50. Wires 54 and 56 form a short in circuit 40 diverting current away from the engaging member 32, so that member 32 can be cut without opening circuit 40. For the dye version, wires 54 and 56 are driven along passageways 58 by the push rods and open a valve 64 between the ends 66 of engaging member 32 and a dye receiving chamber 70. Dye receiving chamber 70 is evacuated so that the dye 42 rapidly exits engaging member 32 to fill the vacuum. Then engaging member 32 may be cut away without releasing any dye 42.

Figure 4:
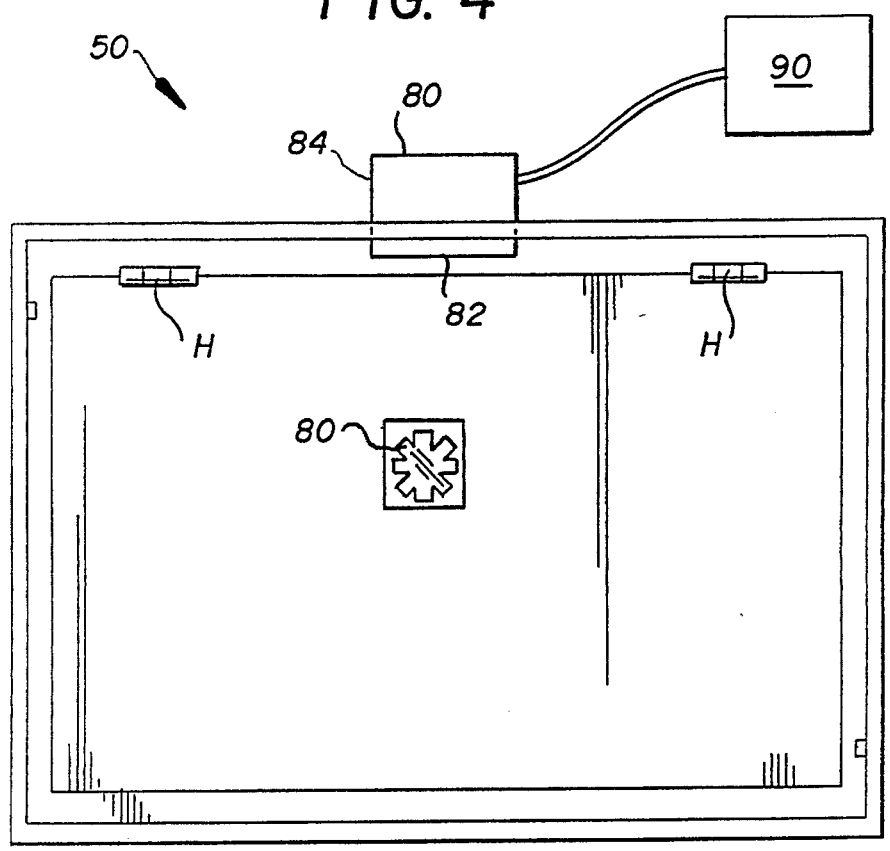
FIG. 4 is a top view of a check-out vessel capable of checking the inventive item tags, with an item receiving door removed, revealing an item tag receiving slot, the display means scanning device, a micro-processor wired to the scanning device, and an item releasing door mounted on hinges H.
Figure 5:
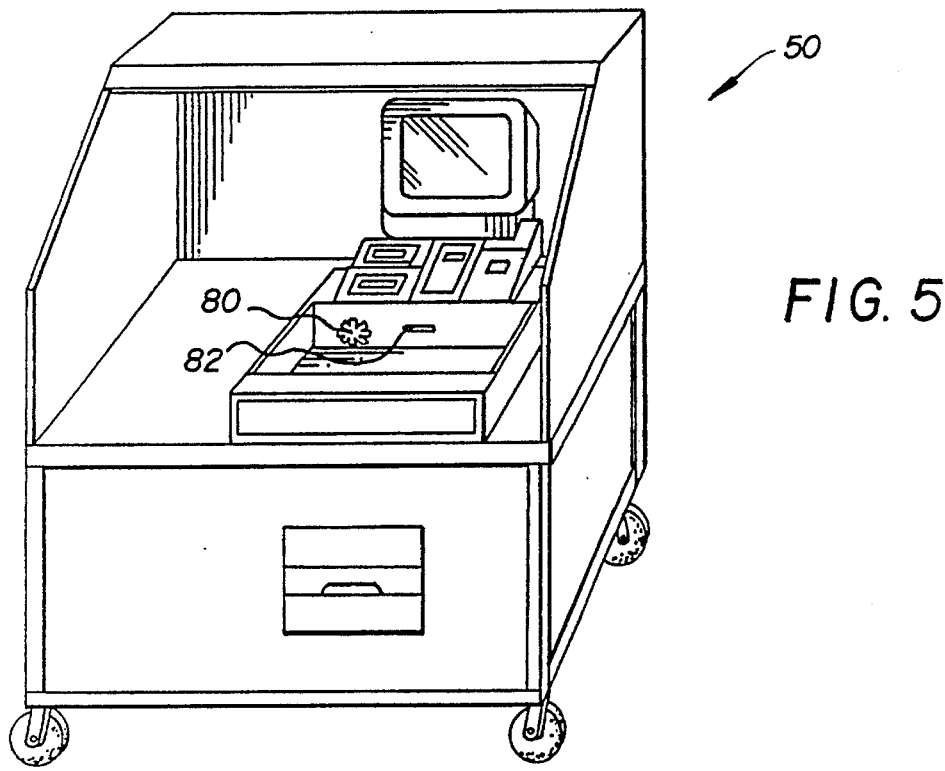
FIG. 5 is a perspective view of a check-out table capable of checking the inventive item tags, having the roll-down top and automatic bagging apparatus contained below the table top.
Figure 6:
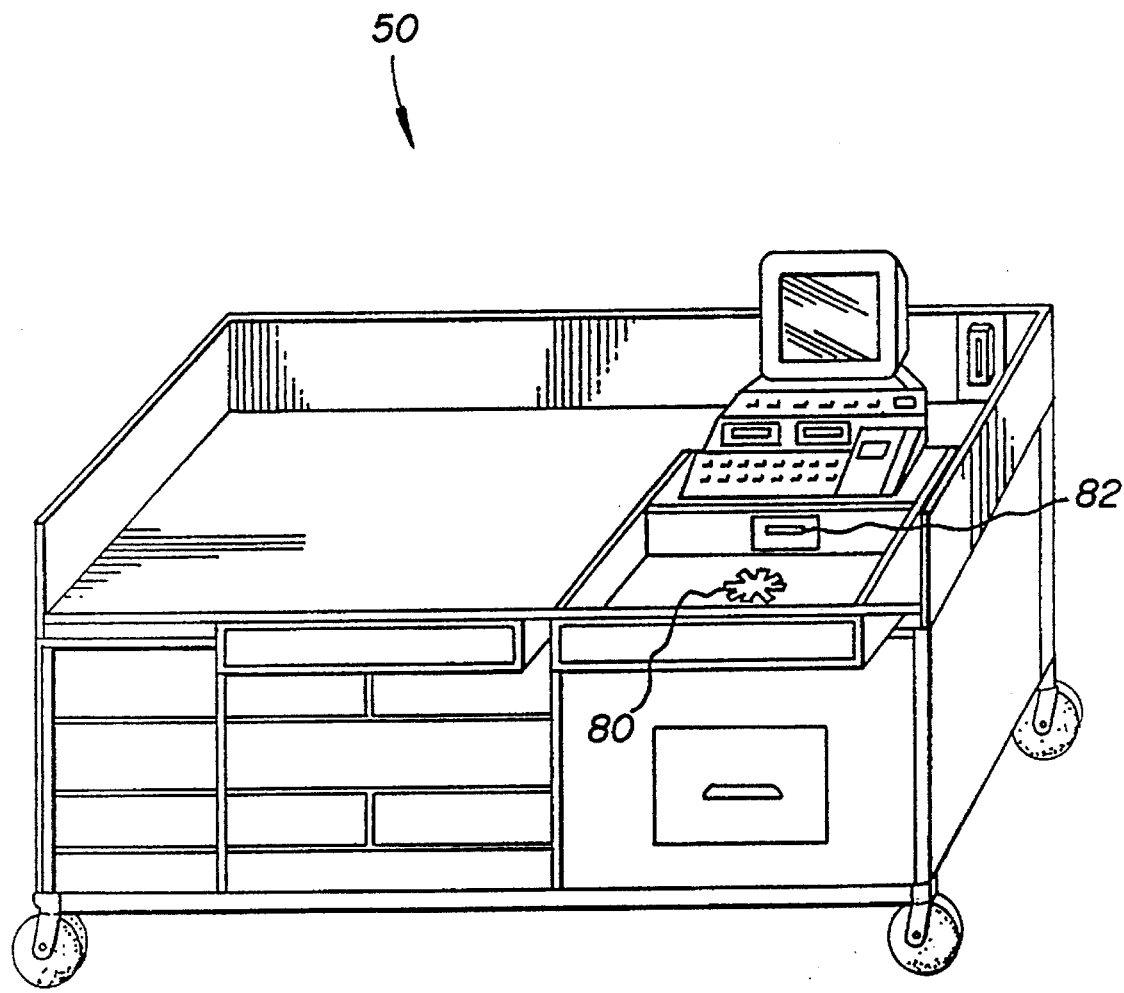
FIG. 6 is a perspective view of another check-out table capable of checking the inventive item tags, having the roll-down top and automatic bagging apparatus contained below the table top. A register drawer, shelves and a telephone are additionally shown.
Figure 7:
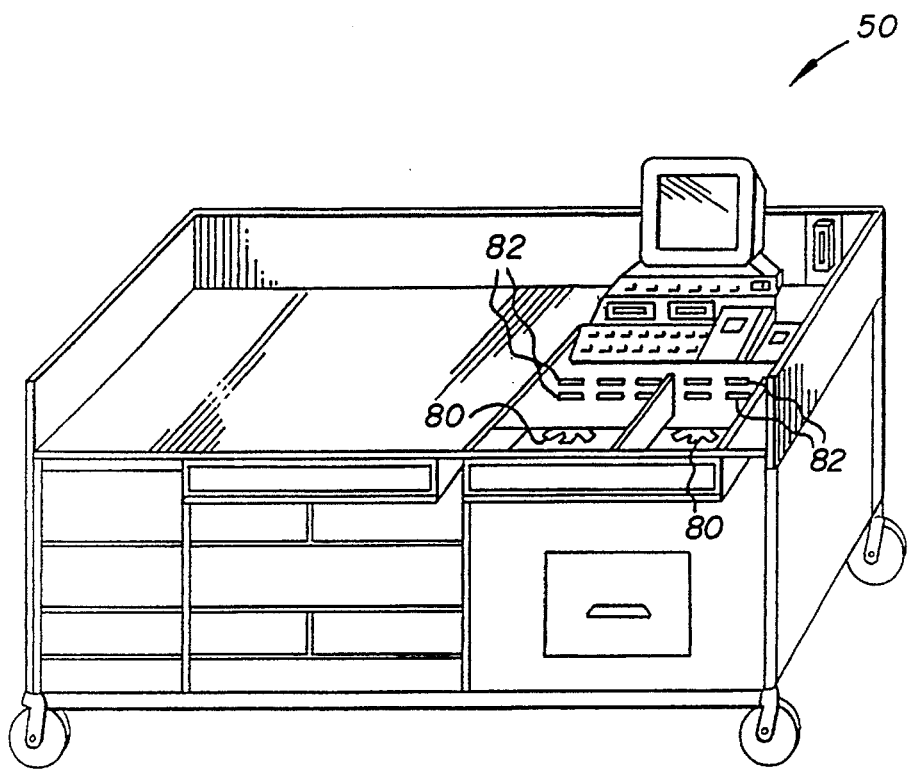
FIG. 7 is a view as in FIG. 6 of a check-out table, but having several item tag receiving slots.

Apparatus 10 is scanned and security mechanism 30 is deactivated with a scanning device 80 at an item check-out station 50. See FIGS. 3–7. Device 80 might include a tag receiving slot 82 in a face of a wall of check-out station 50. A scanning device 80 suitable for reading a bar code 22, magnetic strip 24 or chip 26 which is positioned adjacent slot 82. See FIG. 4. Scanning device 80 includes a tag security deactivation and optional tag apparatus 10 removal means 84.

Figure 8:
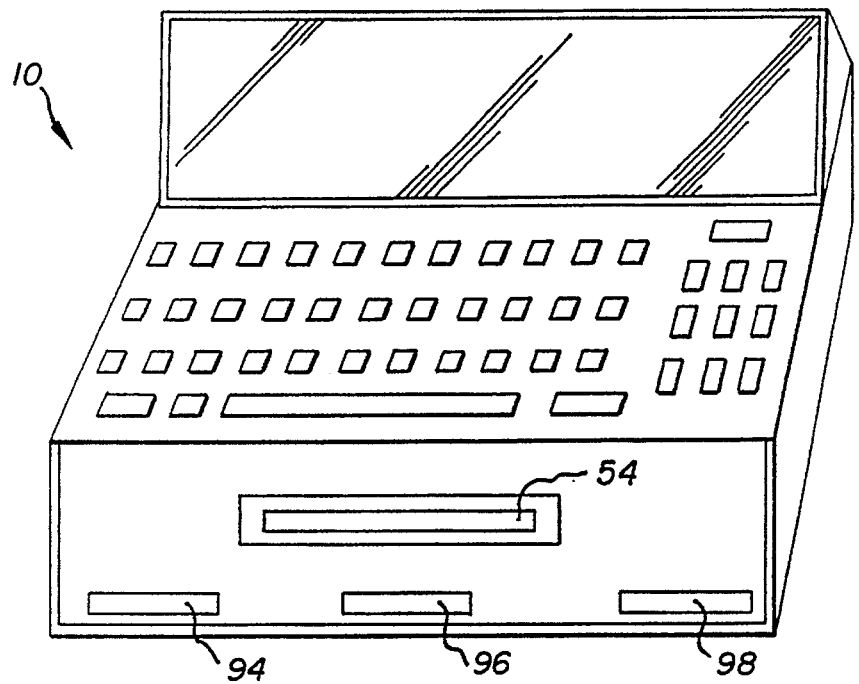
FIG. 8 is a perspective view of a preferred portable version of the inventive check-out apparatus, including a battery power supply, memory, connection port to a microprocessor.

Portable equipment may be provided to read and write data stored in item 12 information display means 16, the equipment including a printer for printing bar codes and for printing other data such as item 12 price, size and color on an adhesive sticker. See FIG. 8. The portable equipment preferably includes means for dispensing such adhesive stickers and means for sticking them onto tag bodies 14 in an appropriate location. Additional preferred features include a power source 94 such as a solar cell and a battery, machine readable memory 96, a terminal connector 98, means for separating tag bodies 14 from items 12 without triggering alarm 34, and means for issuing new tag bodies 14 if required. The portable equipment is of a size, weight and configuration suitable for movement around a store with a store employee and for connection to a main computer through the portable equipment machine readable memory and/or through a radio frequency, to permit the checking of items 12 inside the store. This checking includes reading data stored in each apparatus 10, modifying stored data in the event of a sale or other changes in item 12 prices as business may require.

Apparatus 10 preferably also triggers a store exit alarm if passed through a conventional store exit sensor without first being processed for purchase at a check-out station 50. Information display scanning device 80 reads the price and any other item 12 data stored in the given information display means 16. A microprocessor 90 may be provided for processing and storing the scanned data for each item 12 in each transaction. Then display scanning device 80 deactivates, deletes or replaces data stored in apparatus 10, or removes the apparatus 10 altogether, so that the purchase item 12 may be taken through the store exit alarm without activating the exit alarm.

Many types of purchase items 12 may be tagged with apparatus 10. Contemplated types of items 12 include but are not limited to grocery items, clothing, footwear, cosmetics, electronics, accessories, drugstore items, hardware and general retail merchandise items 12.

Variations of the Preferred Embodiment

The type of tag 10 used for a given type of purchase item 12 may depend upon the value of the type of purchase item 12. A very simple and inexpensive version of tag 10 containing the item data only in the form of a bar code 22 may be used for inexpensive items 12, such as for T-shirts. Rather than having a hollow shell tag body 14, these simpler versions may just include a solid mounting panel. The engaging member 32 for this basic version might be simply a strong, solid steel wire capable of being cut only by the checking apparatus. A tag apparatus 10 with a magnetic strip 24 and a dye-filled engaging member 32 might be used for medium priced items 12, while an elaborate tag 10 with microprocessor 90 chip and electric alarm 34 might be attached to a high priced item 12. The more elaborate tags 10 might display advertising messages in digital display panels 28.

Tag apparatus 10 may have a construction similar to a calculator, including digital information display panels 28 which are LCD's. This version of apparatus 10 may include High Energy Cells backed up by a battery 36. A button activates the display panels 28 to display item 12 data to save energy in the event that solar cells cannot provide sufficient energy due to low environmental luminosity of the store.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A purchase item security and information tag apparatus for attachment to a purchase item in a store, comprising:

a tag body, purchase item information display means for retaining item data in machine readable form, a tag engagement security means including an elongate item engaging member which spoils the item with dye if cut away from the item by a customer, wherein said tag engagement security means comprises a tubular item engaging member containing a dye, such that said dye escapes and spoils said purchase item if cut by a customer without prior deactivation of said tag engagement security means, wherein said tag engagement security means comprises a substantially evacuated dye receiving chamber, a valve between said engaging member and said dye receiving chamber, and deactivation means including a control wire provided within a wire guide means in said tag body, said wire guide means opening as a port in an outer surface of said tag body, said wire operating said valve when said wire is driven along said wire guide means away from said port to open fluid communication between said engaging member and said chamber such that said dye exits said engaging member to fill said substantially evacuated chamber, such that said engaging member may be cut without releasing dye.

2. An apparatus according to claim 1, wherein said valve is a check valve to prevent dye from exiting said chamber.

3. An apparatus according to claim 1, additionally comprising exit alarm triggering means for triggering a store exit alarm having an exit alarm sensor when passed near said exit alarm sensor.

4. A purchase item security and information tag apparatus for attachment to a purchase item in a store, comprising:

a tag body, purchase item information display means for retaining item data in machine readable form, a tag engagement security means including an elongate item engaging member which sounds an alarm if cut away from the item by a customer, wherein said tag engagement security means comprises an electrically conductive item engaging member configured as a loop for extending through part of a purchase item and forming part of an electric circuit comprising alarm means and a power source, such that opening said circuit by breaking said engaging member prior to deactivation sounds said alarm means, and wherein said tag engagement security means comprises deactivation means including a control wire provided within a wire guide means in said tag body, said guide means opening as a port in said tag body, said control wire making contact with said circuit when slid along said wire guide means and away from said port, such that said wire forms a short in said circuit diverting current away from said engaging member, such that said engaging member can be cut without opening said circuit.

5. An apparatus according to claim 4, wherein said tag body comprises a hollow shell containing said purchase item information display means.

6. An apparatus according to claim 4, wherein said information display means comprises a bar code.

7. An apparatus according to claim 4, wherein said information display means comprises a magnetic strip.

8. An apparatus according to claim 4, wherein said information display means comprises a computer chip.

9. An apparatus according to claim 4, additionally comprising a digital display panel for displaying at least part of said purchase item data discernable to the human eye.

10. An apparatus according to claim 4, additionally comprising exit alarm triggering means for triggering a store exit alarm having an exit alarm sensor when passed near said exit alarm sensor.

* * * * *